US012047352B2

(12) United States Patent
Kale et al.

(10) Patent No.: US 12,047,352 B2
(45) Date of Patent: Jul. 23, 2024

(54) SECURITY CONFIGURATIONS FOR ZONAL COMPUTING ARCHITECTURE

(71) Applicant: Micron Technology, Inc., Boise, ID (US)

(72) Inventors: Poorna Kale, Folsom, CA (US); Robert Noel Bielby, Placerville, CA (US)

(73) Assignee: Micron Technology, Inc., Boise, ID (US)

(*) Notice: Subject to any disclaimer, the term of this patent is extended or adjusted under 35 U.S.C. 154(b) by 282 days.

(21) Appl. No.: 17/646,420

(22) Filed: Dec. 29, 2021

(65) Prior Publication Data

US 2023/0208815 A1 Jun. 29, 2023

(51) Int. Cl.
*H04L 9/40* (2022.01)
*G06F 8/65* (2018.01)
*G06F 21/57* (2013.01)

(52) U.S. Cl.
CPC .............. *H04L 63/029* (2013.01); *G06F 8/65* (2013.01); *G06F 21/572* (2013.01); *H04L 63/0876* (2013.01); *G06F 2221/033* (2013.01)

(58) Field of Classification Search
CPC ... H04L 63/029; H04L 63/0876; H04L 63/08; G06F 8/65; G06F 21/572; G06F 2221/033; G06F 21/44; G06F 21/57
See application file for complete search history.

(56) References Cited

U.S. PATENT DOCUMENTS

| | | | | |
|---|---|---|---|---|
| 2017/0302626 | A1* | 10/2017 | Yan | H04L 63/101 |
| 2017/0366521 | A1* | 12/2017 | Lei | H04W 4/14 |
| 2018/0310173 | A1* | 10/2018 | Yonemura | H04L 9/30 |

FOREIGN PATENT DOCUMENTS

EP 2959654 B1 * 3/2017 .......... B61L 15/0018

* cited by examiner

*Primary Examiner* — Mohammad W Reza
(74) *Attorney, Agent, or Firm* — Holland & Hart LLP

(57) ABSTRACT

Methods, systems, and devices for security configurations for zonal computing architecture are described. A zonal computing system in a vehicle may be associated with multiple zones. The zonal computing system may include devices (e.g., sensors, actuators) that interact with the vehicle or an environment associated with the vehicle. A memory system included in the zonal computing system may authenticate whether a device associated with a zone is a trusted device and enable or restrict communications with the device based on the authentication. For example, the zonal computing system may include a central processor that communicates with a remote server and the multiple zones and may include a gateway processor coupled with the central processor and the device and associated with the zone. Based on whether the device is trusted, the memory system may enable or restrict communications between the central processer and the device and routed through the gateway processor.

25 Claims, 6 Drawing Sheets

SECURITY CONFIGURATIONS FOR ZONAL COMPUTING ARCHITECTURE

FIELD OF TECHNOLOGY

The following relates to one or more systems for memory, including security configurations for zonal computing architecture.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read the state of one or more memory cells within the memory device. To store information, a component may write one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Some systems, such as a vehicle system, may implement devices or computing components that interact with the vehicle system or an environment associated with the vehicle system. For example, a vehicle may include sensors for measuring physical properties associated with the vehicle or an environment of the vehicle, actuators configured to control various vehicle systems or subsystems, or both, among other types of devices and computing devices. Additionally, a vehicle may implement a zonal computing architecture in order to manage the various devices that may be incorporated into the vehicle, for example, at manufacturing or integrated at later times. For example, a vehicle may include a zonal computing system in which different groups of devices are separated into different zones of the vehicle. Each zone may include one or more gateway processors that are configured to route communications between the devices of the zone and one or more central processors of the zonal computing system. A challenge of including these devices into the vehicle is ensuring that each device is trusted (e.g., has not been hacked or compromised, does not include faulty or malicious software) so that the vehicle may operate correctly. As more and more devices are incorporated into a vehicle, security vulnerabilities may increase.

Techniques, systems, and devices are described herein for incorporating memory systems that include authentication capabilities into a zonal computing system of a vehicle. For example, the zonal computing system of the vehicle may include a memory system that is able to authenticate (e.g., verify, determine) whether a device is a trusted device and enable communications or restrict communications between the device and a central processor of the zonal computing system based on the authentication. The memory system may be incorporated at various nodes of the zonal computing system. For example, the memory system may be coupled with or included in the central processor. Additionally or alternatively, the memory system may be coupled with or included in a gateway processor of the zonal computing system that is coupled with the device and the central processor. Additionally or alternatively, the memory system may be coupled with or included in the device itself. In this way, the memory system may authenticate each device of the vehicle to increase vehicle security and protect the vehicle (e.g., correct operation of the vehicle) from compromised or malicious devices.

Figure 1:
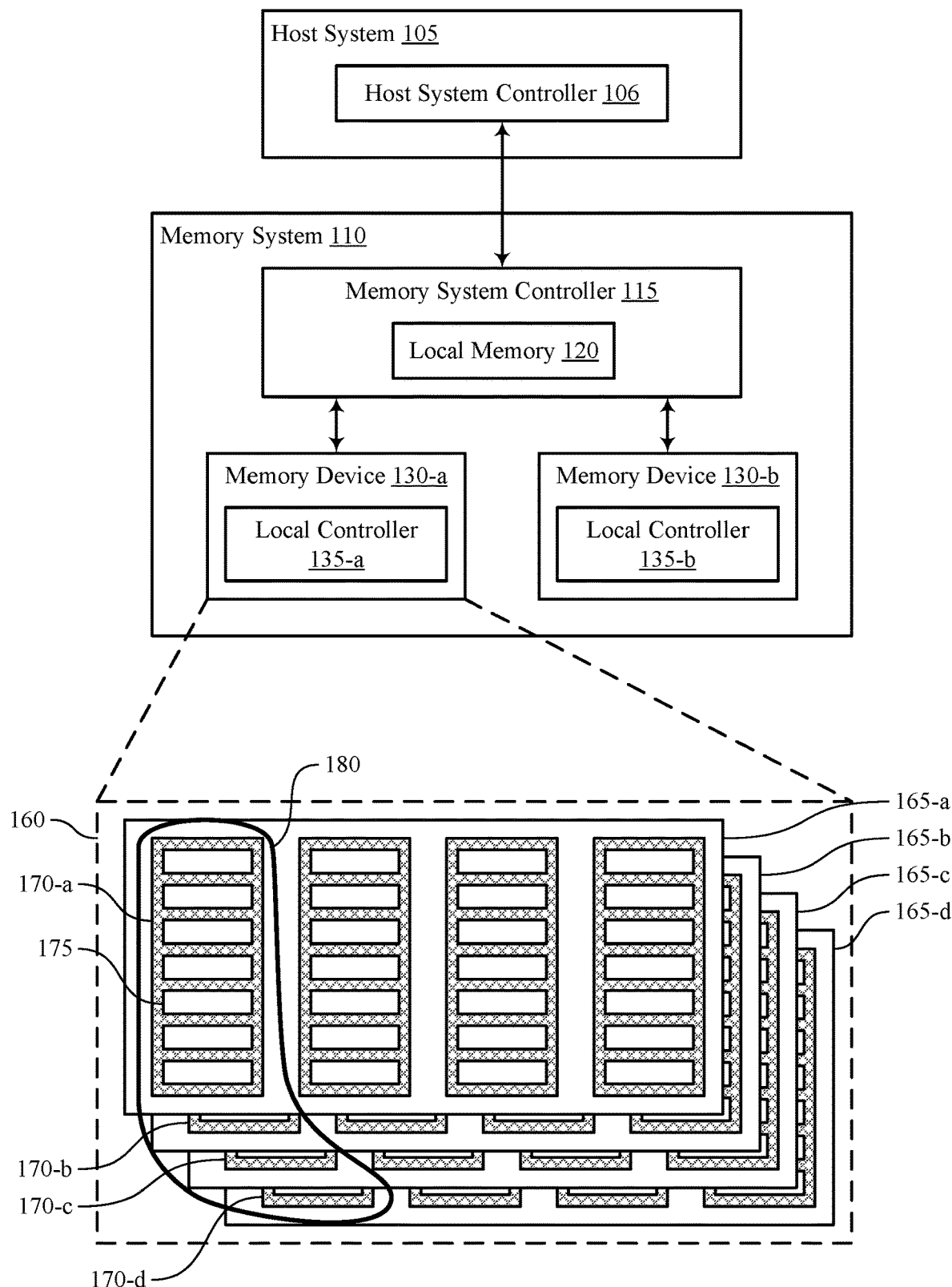
FIGS. 1, 2, and 3 illustrate examples of systems that support security configurations for zonal computing architecture in accordance with examples as disclosed herein.
Figure 2:
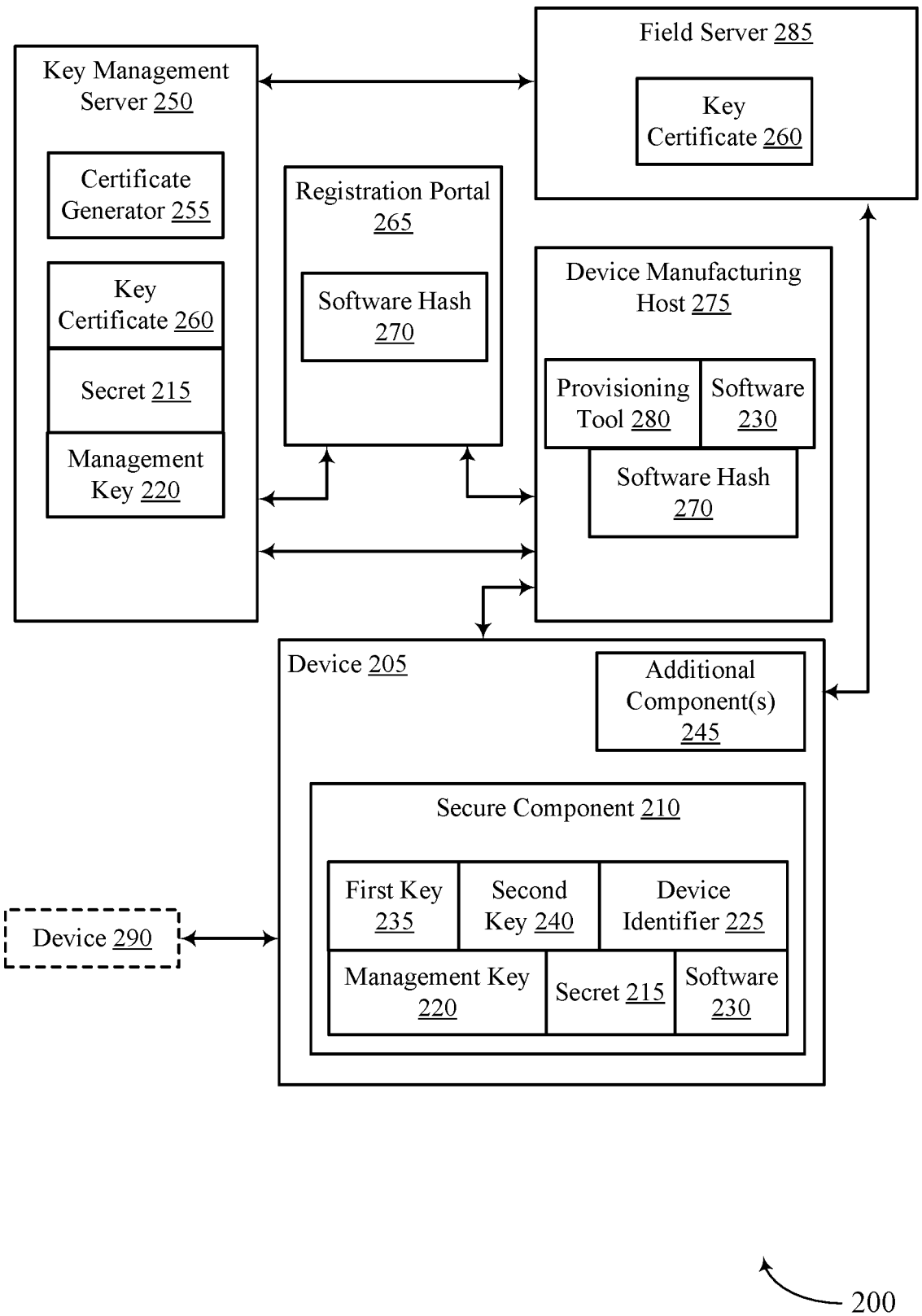
Figure 3:
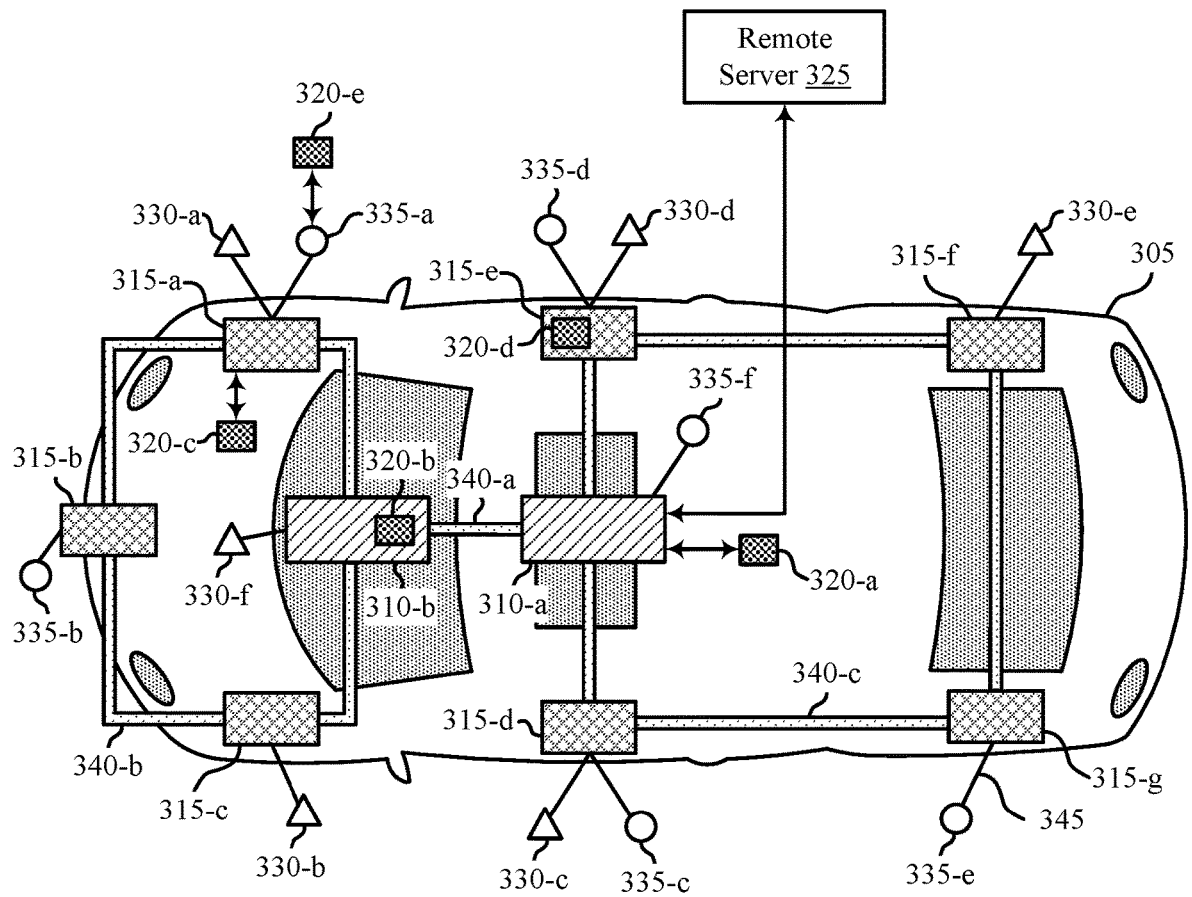

Features of the disclosure are initially described in the context of systems with reference to FIGS. 1 through 3. Features of the disclosure are described in the context of device configurations with reference to FIG. 4. These and other features of the disclosure are further illustrated by and described in the context of an apparatus diagram and flowchart that relate to security configurations for zonal computing architecture with reference to FIGS. 5 and 6.

FIG. 1 illustrates an example of a system 100 that supports security configurations for zonal computing architecture in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof.

Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block 180 may include blocks 170 from different memory devices 130 (e.g., including blocks 170 in one or more planes 165 of memory device 130-a and memory device 130-b). In some cases, the blocks 170 within a virtual block 180 may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support security configurations for zonal computing architecture. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

The memory system 110 may be incorporated into (e.g., included in, added to) a zonal computing system of a vehicle, for example, to verify whether devices of the zonal computing system are trusted devices. For example, the zonal computing system may include devices, such as sensors or actuators, that are configured to interact with the vehicle or an environment associated with the vehicle. Additionally, the zonal computing system may include one or more central processors configured to communicate information with the devices and manage some operations of the vehicle based on the communicated information. The information may be routed through one or more gateway processors of the zonal computing system. In some examples, the host system 105 may be included in the zonal computing system of the vehicle. For instance, the host system 105 may be an example of a central processor of the zonal computing system, a gateway processor of the zonal computing system, or a device of the zonal computing system.

The memory system 110 may be configured to perform an authentication procedure that verifies whether a device of the zonal computing system is a trusted device. If the memory system 110 determines that the device is a trusted device, the memory system 110 may enable communications between the device and the one or more central processors (e.g., via a gateway processor). Alternatively, if the memory system 110 determines that the device is an untrusted device, the memory system 110 may restrict communications between the device and the one or more central processors (e.g., and alert the one or more central processors that the device is untrusted). In this way, the memory system 110 may increase vehicle security and protect the vehicle (e.g., correct operation of the vehicle) from compromised or malicious devices by authenticating (e.g., periodically) each device of the zonal computing system.

It is noted that, in some examples, the techniques described herein are described with reference to the memory system 110 being a NAND memory system, however, the techniques described herein may be adapted and applied to support such techniques within any type of memory system (e.g., a DRAM system, an FeRAM system, a PCM system, etc.).

FIG. 2 illustrates an example of a system 200 that supports authenticating a device using a remote host in accordance with examples as disclosed herein. The system 200 may include a device 205, a key management server 250, a registration portal 265, a device manufacturing host 275, and a field server 285. The device 205 may be an example of a memory system that includes security and authentication capabilities.

The device 205 may include a secure component 210 that is configured to securely store at least a secret 215. The secret 215 may be an example of a unique device secret (UDS). In some cases, the secure component 210 may store a management key 220. The management key 220 may be an example of a server root key (SRK). The server root key may allow an entity in possession of a copy of the management key 220 to manage the secure component 210 by turning on a security feature of the secure component 210. The device 205 may include one or more components associated with a memory device that are operable to perform one or more authentication procedures for the entire device 205. The device 205 may be an example of a vehicle, a component of a zonal computing system of a vehicle, an infotainment system of a vehicle, a personal computer, a portable electronic device, a server, or any other type of computing device.

The secure component 210 may include a device identifier 225 generated according to a device identifier composition engine (DICE) standard. In some cases, the device identifier 225 may be based on the secret 215 and software 230. The device identifier 225 may be used to generate asymmetric key pairs, such as a first key pair 235 and a second key pair 240. The first key pair 235 may be an example of an alias key pair, and the second key pair 240 may be an example of a device identification key pair. In some examples, the device 205 may include one or more additional component(s) 245 that are connected to the secure component 210 to provide the functionality of the device 205 in connection with the software 230.

In some examples, a set of commands may be executed in the device 205 to generate the device identifier 225 from the secret 215 and from a cryptographic software hash 270. In such cases, the device 205 may be in communication with the device manufacturing host 275. The device manufacturing host 275 may include a provisioning tool 280, the software 230, and the software hash 270. The execution of the set of commands may further generate the asymmetric key pair, such as the first key pair 235 and the second key pair 240.

The system 200 may include a key management server 250 that is in communication with the device manufacturing host 275. The key management server 250 may include a certificate generator 255. The certificate generator 255 may be configured to emulate a feature of the device 205 in generating the asymmetric key pairs. For example, the certificate generator 255 may be configured to use the same set of commands executed in the device 205 to generate the device identifier 225 from a copy of the secret 215 stored in the key management server 250 and from the software hash 270 received from a registration portal 265. In such cases, the registration portal 265 may be in communication with the device manufacturing host 275 and the key management server 250.

The set of commands executed in the certificate generator 255 may generate the asymmetric key pair (e.g., the first key pair 235 and the second key pair 240). For example, the software hash 270 and the secret 215 may be combined to create a key. In some examples, the certificate generator 255 may generate a certificate (e.g., key certificate 260) based on the key. For example, the certificate generator 255 may digitally sign a certificate (e.g., a key certificate 260) for a public key in the corresponding asymmetric key pair using a private key of the certificate generator 255 or the key management server 250. The authenticity of the key certificate 260 may be verified via a public key of the certificate generator 255.

In some cases, the key management server 250 may provide the key certificate 260 of the device 205 to the field server 285, thereby enabling the field server 285 to authenticate the device 205 based on the public key certified by the certificate generator 255 and messages (e.g., certificates) signed by the device 205 using its corresponding private key. In such cases, the field server 285 may validate the authenticity of the public key having the certificate signed by the certificate generator 255.

Once a public key of the device 205 is certified, the device 205 may use the corresponding private key to authenticate itself to the field server 285. In such cases, the device 205 may communicate directly with the field server 285. In some examples, the device 205 may digitally sign a message using the private key. If the public key that is associated with a private key of the device 205 is used to verify the digital signature of the certificate, the device 205 may be considered to have possession of the private key. In other examples, the device 205 may be considered to have the identity specified in the certificate signed by the public key. In such cases, the system 200 allows the device 205 to be loaded with software at a time and location different from the implementation of the secrets in the secure component 210 (e.g., management key 220 and secret 215). The system 200 may also allow the device 205 to connect to a service based on a valid public key.

The field server 285 may include multiple, different services for the device 205. In some cases, the different services depend on the device state. For example, when the device 205 is registered through the registration portal 265, one or more software hashes 270 may be uploaded. Each software hash 270 may represent a valid version of the device 205. In some cases, the device 205 may go through a supply chain that may include multiple steps, where each step may represent a different version of software 230. The field server 285 may request what step the device is at in the supply chain in order to be notified of the version of software 230.

The device 205 may be registered by uploading every software hash 270 (e.g., indicating each step in the supply chain) to the registration portal 265. The certificate generator 255 may generate a certificate for each software hash 270. In such cases, the key management server 250 may upload each version of the software hash 270 to the field server 285. When the device 205 presents a key to the field server 285, the field server 285 may connect the device 205 to the service associated with the device state (e.g., software hash 270).

In some examples, the device 205 may modify a list of software hashes 270 uploaded to the registration portal 265. For example, the device 205 may request to add or remove a software hash 270 from the list of software hashes 270. In some examples, the device 205 may communicate the request to add or remove the software hash 270 directly to the key management server 250 rather than communicating with the key management server 250 via the registration portal 265. The certificate generator 255 may regenerate a certificate based on if they software hash 270 is removed or added.

In some examples, the field server 285 may include one or more key certificates 260. When the field server 285 receives a key from the device 205, the field server 285 may compare each of the key certificates 260 in the field server 285 to the received key. In other examples, the field server 285 may identify a key certificate 260 for comparison based on the device state. For example, the device 205 may send a notification to the field server 285 of the device state. Based on the device state, the field server 285 may check the certificate that corresponds to the device state.

In some examples, the device 205 may transmit a connection request to the field server 285. The request may include a key and device identifying information (e.g., a device identification (ID)). The field server 285 may match the connection request (e.g., the key) with a key certificate 260. If the key presented is not valid (e.g., does not match the key certificate 260), then the field server 285 may determine that the device 205 is an untrusted device (e.g., includes faulty or malicious software).

The system 200 may illustrate a process to onboard software 230 on the device 205 with a configuration for secure authentication of the device 205 in accessing the field server 285. For example, the secure component 210 may be configured in a factory without any knowledge or access to software 230 that may be subsequently developed and/or installed in the device 205 that uses the secure component 210. When the secure component 210 is in the factory, secrets (e.g., management key 220 and secret 215) of a first root-of-trust may be injected into the secure component 210. A copy of the secrets may be stored into the key management server 250 (e.g., with an identification of the secure component 210) via a secure connection between the factory and the key management server 250.

In some examples, a device manufacturer develops a design of the device 205 that integrates the secure component 210 and additional components 245. The software 230 for operating the device 205 may become available at the facility (e.g., field server 285) of the device manufacturer. In some cases, the provisioning tool 280 may be used to install the software 230 in the secure component 210 and generate information about the software 230. The information about the software 230 may be used in the device 205 to generate the device identifier 225 of the device 205.

The information about the software 230 may be an example of the software hash 270 of the software 230. For example, the software hash 270 may be a cryptographic function of the source code of the software 230. In some cases, the software hash 270 may represent information of a second root-of-trust associated with the device manufacturer. In other examples, the software hash 270 may be digitally signed using a private key of the device manufacturer.

The software hash 270 used for the generation of keys in the device 205 may be communicated to the key management server 250 via a registration portal 265 during the registration of the secure component 210. In some cases, the software hash 270 may be provided to the device 205 as part of an installation process of the software 230 in the device 205. In such examples, the key certificate 260 stored on the field server 285 may be based on the software hash 270 of the original software. Any updates to the software 230 of the device may not be reflected in the key certificate 260 stored by the field server 285. In some examples, the certificate generator 255 may use the software hash 270 to generate a public key of the device 205, independent of the operations of the device 205, and sign the key certificate 260 for the public key of the device 205.

The registration portal 265 may use the management key 220 to manage the secure component 210 and activate the security feature of the secure component 210 after the registration of the secure component 210 and/or after the generation of the key certificate 260. After the security feature of the secure component 210 is activated, the secure component 210 installed in the device 205 may be used in generating the device identifier 225 of the device 205 and cryptographic keys (e.g., the first key pair 235 and the second key pair 240) of the device identifier 225.

The system 200 may support the authentication and verification of a device 290 that communicates or is coupled with the device 205 (e.g., physically separate from the device 205). For example, in some cases, the device 205 may be an example of a central processor or a gateway processor of a zonal computing system of a vehicle, and the secure component 210 may be an example of a memory system (e.g., a memory system 110) that is capable of authenticating whether a device 290 (e.g., a sensor, an actuator) of the zonal computing system is a trusted device. For instance, the secure component 210 may receive information from the device 290 (e.g., a device ID of the device 290, a key, a message signed with a cryptographic key, a hash of code signed with the cryptographic key, and the like) that enables the secure component 210 to verify whether the device 290 is a trusted device (e.g., verify the identity of, or code operating on, the device 290). Based on the verification of the device 290, the secure component 210 may be configured to enable or restrict communications between the device 205 and the device 290.

In some examples, the device 205 may be an example of a sensor or an actuator included in a zonal computing system of a vehicle. Here, the secure component 210 may be embedded in or coupled with the device 205 and may be configured to verify whether the device 205, or code operating on the device 205, is trusted. For example, the secure component 210 may receive information from the device 205 that enables the secure component 210 authenticate an identity of, or the code operating on, the device 205. Based on whether the device 205, or the code operating on the device 205, is trusted, the secure component 210 may enable or restrict communications between the device 205 and a central processor of the zonal computing system of the vehicle.

FIG. 3 illustrates an example of a system 300 that supports security configurations for zonal computing architecture in accordance with examples as disclosed herein. The system 300 may implement or be implemented by aspects of the systems 100 and 200 described with reference to FIGS. 1 and 2. For example, the system 300 may depict operation of a zonal computing system of a vehicle 305 that includes various components, such as central processors 310, gateway processors 315, memory systems 320, actuators 330, and sensors 335, which may be examples of corresponding devices described with reference to FIGS. 1 and 2. The system 300 may support the authentication and management of devices that may be incorporated into the vehicle 305 to increase vehicle security and protect the vehicle 305 (e.g., correct operation of the vehicle 305) from compromised or malicious devices.

The vehicle 305 may implement a zonal computing architecture to manage various devices that may be included in the vehicle 305. For example, the vehicle 305 may include a zonal computing system in which different groups of components of the vehicle 305 are divided into various zones and managed in accordance with the zones. The zonal computing system may include one or more central processors 310 that are configured to communicate with a remote server 325. For example, the zonal computing system may include a central processor 310-a and a central processor 310-b that may each be configured to communicate with the remote server 325. The remote server 325 may be configured to perform authentication services for various components of the zonal computing system. For example, the remote server 325 may be an example of, or perform one or more operations of, a field server 285 or a key management server 250 described with reference to FIG. 2. In some examples, the remote server 325 may provide the vehicle 305 access to a network, and the vehicle 305 may receive data from the network via the remote server 325. In some examples, the remote server 325 may be an example of a cloud server. The central processors 310 may communicate with the remote server 325 wirelessly, for example, using one or more antennas of the vehicle 305 in accordance with one or more radio access technologies.

The central processors 310 may additionally be configured to communicate with various zones of the zonal computing system. For example, the zonal computing system may include gateway processors 315, actuators 330 that are configured to control (e.g., trigger, cause, or perform actions with) a subsystem of the vehicle 305, and sensors 335 that are configured to measure a physical property associated with the vehicle 305 or an environment associated with the vehicle 305 (e.g., a motion sensor, a camera, a radar sensor, a speedometer, a gas meter, a fuel temperature sensor, an oxygen sensor, a light detection and ranging (LiDAR) sensor, or some other sensor that may be included in the vehicle 305), among other computing components that may be included in the zonal computing system. Each of the gateway processors 315, actuators 330, and sensors 335 may be associated with a respective zone of the zonal computing system. The gateway processors 315 may be coupled with at least one of the central processors 310 (e.g., directly or via one or more other gateway processors 315) and with one or more actuators 330, sensors 335, or a combination thereof. Additionally, the gateway processors 315 may be configured to route communications between the at least one central processor 310 and the respective actuators 330 or sensors 335 with which the gateway processors 315 are coupled. Accordingly, the central processors 310 may be configured to communicate with devices (e.g., actuators 330, sensors 335) of a zone via one or more gateway processors 315 associated with the zone. In some examples, a zone may include a communication path coupled with one or more gateway processors 315.

In the example of FIG. 3, the zonal computing system may include a gateway processor 315-a, a gateway processor 315-b, a gateway processor 315-c, a gateway processor 315-d, a gateway processor 315-e, a gateway processor 315-f, and a gateway processor 315-g, although any quantity of gateway processors 315 may be included in the zonal computing system of the vehicle 305. In some examples, each gateway processor 315 may be associated with a different zone of the zonal computing system. For example, the gateway processor 315-a may be associated with a first zone of the zonal computing system, the gateway processor 315-b may be associated with a second zone of the zonal computing system, the gateway processor 315-c may be associated with a third zone of the zonal computing system, the gateway processor 315-d may be associated with a fourth zone of the zonal computing system, the gateway processor 315-e may be associated with a fifth zone of the zonal computing system, the gateway processor 315-f may be associated with a sixth zone of the zonal computing system, and the gateway processor 315-g may be associated with a seventh zone of the zonal computing system. In other examples, multiple gateway processors 315 may be associated a single zone of the zonal computing system. For example, the gateway processor 315-a, the gateway processor 315-b, and the gateway processors 315-c may be associated with the first zone; the gateway processor 315-d and the gateway processor 315-e may be associated with the second zone, and the gateway processor 315-f and the gateway processor 315-g may be associated with the third zone.

The actuators 330 and sensors 335 included in the vehicle 305 may be associated with the respective zones of the gateway processors 315 with which they are coupled. For example, in the example of FIG. 3, the gateway processor 315-a may be coupled with an actuator 330-a and a sensor 335-a. The gateway processor 315-b may be coupled with a sensor 335-b. The gateway processor 315-c may be coupled with an actuator 330-b. The gateway processor 315-d may be coupled with an actuator 330-c and a sensor 335-c. The gateway processor 315-e may be coupled with an actuator 330-d and a sensor 335-d. The gateway processor 315-f may be coupled with an actuator 330-*e*. The gateway processor 315-*g* may be coupled with a sensor 335-*e*. Each of the actuators 330-*a* through 330-*e* and sensors 335-*a* through 335-*e* may be associated with (e.g., included in) the zone with which the corresponding gateway processor 315 is associated (e.g., the first zone, the second zone, the third zone, the fourth zone, the fifth zone, or the sixth zone). In some examples, the central processors 310 may be coupled with one or more actuators 330, sensors 335, or a combination thereof. For example, the central processor 310-*a* may be coupled with a sensor 335-*f*, and the central processor 310-*b* may be coupled with an actuator 330-*f*. In some examples, the actuator 330-*f* and the sensor 335-*f* may be associated with different zones of the zonal computing system (e.g., an eighth zone, a ninth zone) or with one of the zones with which the central processors 310 are configured to communicate (e.g., one of the first zone through the seventh zone).

The components of the zonal computing system may communicate according to various communication protocols. For example, the central processors 310 and the gateway processors 315 may be coupled over various signal buses 340 that operate according to a first communication protocol. For instance, the central processor 310-*a* and the central processor 310-*b* may communicate over a signal bus 340-*a*. The central processor 310-*b* may communicate with the gateway processor 315-*a*, the gateway processor 315-*b*, and the gateway processor 315-*c* over a signal bus 340-*b*. The central processor 310-*a* may communicate with the gateway processor 315-*d*, the gateway processor 315-*e*, the gateway processor 315-*f*, and the gateway processor 315-*g* over a signal bus 340-*c*. In some examples, the central processors 310 may communicate with the gateway processors 315 directly or indirectly over the signal buses 340. For example, the central processor 310-*b* may be directly coupled with the gateway processor 315-*a* and the gateway processor 315-*c* over the signal bus 340-*b* and indirectly coupled with the gateway processor 315-*b* over the signal bus 340-*b* via the gateway processor 315-*a*, the gateway processor 315-*c*, or both. Thus, communications between the central processor 310-*b* and the gateway processor 315-*b* may be routed through the gateway processor 315-*a*, the gateway processor 315-*c*, or both. Additionally, the central processor 310-*a* may be directly coupled with the gateway processor 315-*d* and the gateway processor 315-*e* over the signal bus 340-*c* and indirectly coupled with the gateway processor 315-*f* and the gateway processor 315-*g* over the signal bus 340-*c*. In some examples, the signal buses 340 may be examples of ethernet cables and the first communication protocol may be an ethernet communication protocol according to which the central processors 310 and the gateway processors 315 may communicate.

Additionally, the actuators 330 and the sensors 335 may be coupled with respective gateway processors 315 or central processors 310 over various signal buses 345 that operate according to one or more different communication protocols. In some examples, the one or more different communication protocols may be lower capacity or bandwidth communication protocols with respect to the first communication protocol, such as a serial communication protocol. The gateway processors 315 may be configured to translate information between the first communication protocol (e.g., used to communicate information between the gateway processors 315 and the central processors 310) and the one or more different communication protocols (e.g., used between the gateway processors 315 and the actuators 330 and the sensors 335). For example, the gateway processor 315-*a* may translate information that is communicated from the central processor 310-*b* to the actuator 330-*a* from the first communication protocol to a second communication protocol. Additionally, the gateway processor 315-*a* may translate information that is communicated from the actuator 330-*a* to the central processor 310-*b* from the second communication protocol to the first communication protocol.

The central processors 310 may communicate information with the actuators 330 and the sensors 335 to control various operations and functions of the vehicle 305 (e.g., such as operations related to autonomous driving, alert notifications, etc.). Accordingly, ensuring that each of the actuators 330 and sensors 335 included in the vehicle 305 is a trusted device (e.g., or operating trusted code or software) may be vital to ensuring proper function and operation of the vehicle 305 and preventing system failures or malicious attacks.

The zonal computing system of the vehicle 305 may include one or more memory systems 320 that are capable of authenticating (e.g., verifying, determining, identifying) whether a component of the zonal computing system is trusted. Such memory systems 320 may ensure that each device (e.g., actuator 330, sensor 335) that is allowed (e.g., enabled) to communicate with a central processor 310 is a trusted device, thereby increasing vehicle security and protecting proper function and operation of the vehicle 305.

A memory system 320 may be included in (e.g., embedded in) or coupled with a central processor 310, a gateway processor 315, an actuator 330, or a sensor 335. For example, in the example of FIG. 3, the central processor 310-*a* may be coupled with a memory system 320-*a*, the central processor 310-*b* may include (e.g., be embedded with) a memory system 320-*b*, the gateway processor 315-*a* may be coupled with a memory system 320-*c*, the gateway processor 315-*e* may include a memory system 320-*d*, the sensor 335-*a* may be coupled with a memory system 320-*e*, or a combination thereof. It is noted, however, that FIG. 3 depicts an example configuration of memory systems 320 within the vehicle 305 and that any combination of components of the zonal computing system may include or be coupled with a respective memory system 320.

The memory systems 320 may be configured to perform an authentication procedure to verify whether a device (e.g., an actuator 330, a sensor 335) is a trusted device (e.g., or whether code, software, or firmware operating on the device is trusted). Based on the authentication procedure, a memory system 320 may enable or restrict communications between the device and a central processor 310. For example, the memory system 320-*b* may perform an authentication procedure to determine (e.g., verify) whether the actuator 330-*a* is a trusted actuator 330. If the memory system 320-*b* determines that the actuator 330-*a* is the trusted actuator 330 based on (e.g., as a result of) the authentication procedure, the memory system 320-*b* may enable communications between the central processor 310-*b* and the actuator 330-*a*. Alternatively, if the memory system 320-*b* determines that the actuator 330-*a* is an untrusted actuator 330 based on (e.g., as a result of) the authentication procedure, the memory system 320-*b* may restrict the communications between the central processor 310-*b* and the actuator 330-*a*.

As part of an authentication procedure, a memory system 320 may receive first identification information from a device (e.g., an actuator 330, a sensor 335). In some examples, the memory system 320 may receive the first identification information via a gateway processor 315, a central processor 310, or both. For example, the memory system 320-*b* may receive identification information from the actuator 330-*a* via the gateway processor 315-*a* and the central processor 310-*b*. In some examples, the memory system 320 may receive the first identification information directly from the device. For example, the memory system 320-*e* may receive identification information from the sensor 335-*a*. In some examples, the memory system 320 may receive the first identification information in accordance with the first communication protocol or one of the one or more different communication protocols.

The first identification information may enable the memory system 320 to determine whether the device is trusted. For example, the first identification information may include a device ID of the device, a key, a message signed with a cryptographic key, a hash of code signed with the cryptographic key, or some other information that enables the memory system 320 to verify whether the device is trusted. In some examples, to verify the device using the first identification information, the memory system 320 may compare the first identification information with second identification information stored at the memory system 320. For example, as part of the authentication procedure, the memory system 320 may compare the first identification information with the second identification information to determine whether the first identification information and the second identification information match. If the memory system 320 determines that the first identification information and the second identification information match (e.g., or in some other way correspond to each other), the memory system 320 may determine that the device is trusted and enable communications between the device and a central processor 310. Alternatively, if the memory system 320 determines that the first identification information and the second identification information are different based on the comparison, the memory system 320 may determine that the device is untrusted and may restrict the communications between the device and the central processor 310. In some examples, the memory system 320 may also notify the central processor 310 that the device is untrusted (e.g., notify the central processor 310 of the communication restriction).

The memory systems 320 may also support the authentication of updates for components of the zonal computing system (e.g., for the central processors 310, the gateway processors 315, the actuators 330, the sensors 335), such as software updates, firmware updates, key updates, or updates to identification information, among other types of updates. For example, a central processor 310 may receive an update from the remote server 325 that is to be downloaded and installed by a component of the zonal computing system. In some cases, however, such an update may be corrupted or include malicious code such that installation of the update may render the component of the zonal computing system compromised, hacked, or untrusted in some other way.

To prevent such updates from being downloaded and installed, a memory system 320 may perform a second authentication procedure to verify whether an update associated with a component of the zonal computing system is a trusted update. If the memory system 320 verifies that the update is trusted based on the second authentication procedure, the memory system 320 may enable the component of the zonal computing system to download and install the update. Alternatively, if the memory system 320 determines that the update is untrusted based on the second authentication procedure, the memory system 320 may restrict the component of the zonal computing system from downloading and installing the update. For example, the central processor 310-*a* may receive a software update for the sensor 335-*c*. The memory system 320-*a* may be configured to perform the second authentication procedure to verify whether the software update is a trusted update (e.g., is devoid of corrupted or malicious code). The memory system 320-*a* may determine that the software update is trusted and may enable the central processor 310-*a* to forward the software update to the sensor 335-*c* and for the sensor 335-*c* to download and install the software update.

The memory systems 320 may be configured to periodically perform authentication procedures to verify trust (e.g., device trust, software trust, firmware trust, and the like). For example, a memory system 320 may be configured to perform an authentication procedure based on a triggering event, such as a power-on procedure. For instance, the memory system 320 may be configured to perform the authentication procedure in response to a power-on procedure of the vehicle 305, a power-on procedure of the zonal computing system, a power-on procedure of a device (e.g., an actuator 330, a sensor 335), or a combination thereof. In some examples, the memory systems 320 may be periodically authenticated. For example, the memory systems 320 may periodically authenticate themselves via the remote server 325 (e.g., with a key management server 250, with a field server 285). In some examples, the memory systems 320 may be authenticated in response to a triggering event, such as a power-on procedure of the memory systems 320.

By including and implementing the memory systems 320, the zonal computing system may implement a common security method for verifying component and update trust throughout the zonal computing system. Such a common security method may reduce a quantity of unique security functions within the zonal computing system, thereby reducing complexity and potential security failures.

Figure 4:
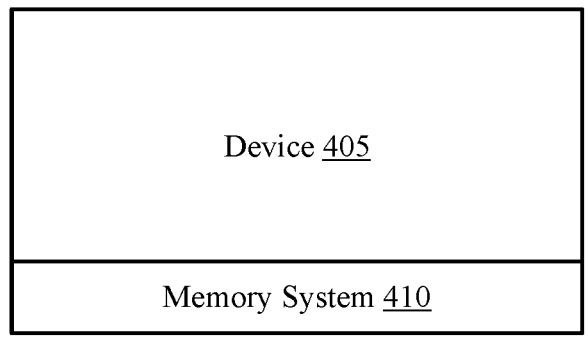
FIG. 4 illustrates example device configurations that support security configurations for zonal computing architecture in accordance with examples as disclosed herein.
Figure 4:
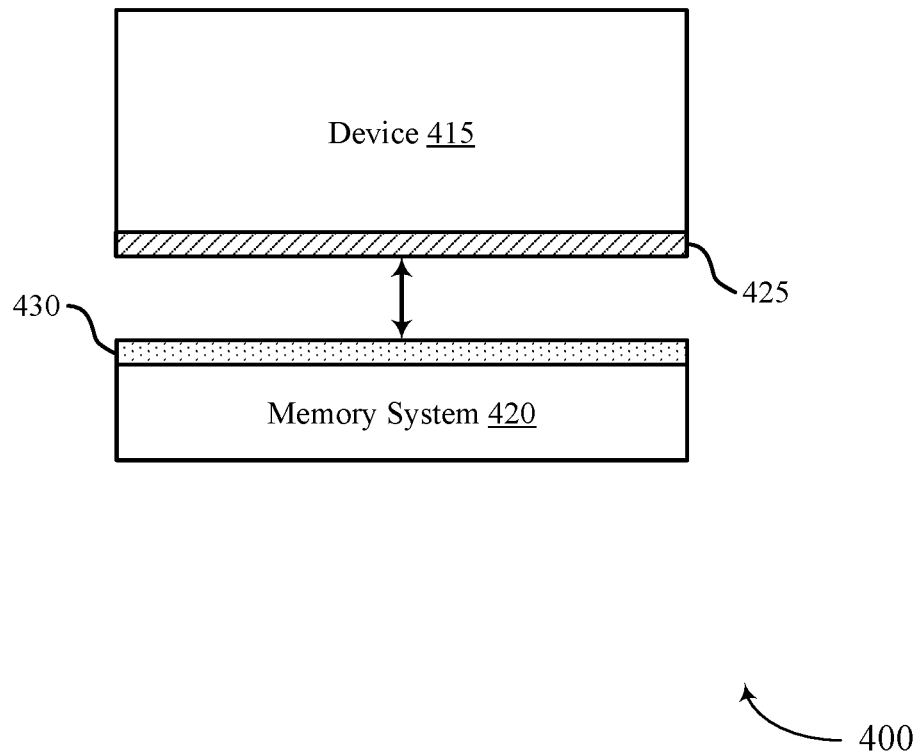

FIG. 4 illustrates example device configurations 400 that support security configurations for zonal computing architecture in accordance with examples as disclosed herein. The device configurations 400 may implement or be implemented by aspects of the systems 100, 200, and 300 described with reference to FIGS. 1 through 3, respectively. For example, the device configurations 400 depict a device 405 and a device 415, which may be examples of an actuator or a sensor included in a zonal computing system of a vehicle (e.g., an actuator 330, a sensor 335). The device configurations 400 further depicts a memory system 410 and a memory system 420, which may be examples of a memory system or a secure component described with reference to FIGS. 1 through 3 (e.g., a memory system 110, a secure component 210, a memory system 320).

The device configurations 400 illustrate various configurations that support direct communication between a device and a memory system for trust authentication. In a first example, the device 405 may include or be embedded with a memory system 410. For example, the device 405 may include storage in which the memory system 410 may be embedded. In a second example, the device 415 and the memory system 420 may be separate devices. Here, the memory system 420 may be configured to interface with a port of the device 415. For example, the device 415 may include an interface 425 and the memory system 420 may include an interface 430 that is configurable to couple with the interface 425 (e.g., according to some standardized port structure). The interface 425 may couple with the interface 430 and support communications between the device 415 and the memory system 420 (e.g., in accordance with a standardized communication protocol). In some examples, the memory system 320 may be detachable from the device 415 based on the interface 425 and the interface 430. For example, the interface 430 of the memory system 320 may be attached to (e.g., plugged into) the interface 425 of the device 415 or may be detached from the interface 425 of the device 415. In this way, storage of the device 415 may be reserved (e.g., saved) for other functions and data associated with the device 415. Additionally or alternatively, devices that are unable to support an embedded memory system (e.g., due to lack or storage capacity) may be configured to interface directly with a memory system. In some examples, the interface 425 and the interface 430 may be an example of a plug and socket type system that enables devices to be removably coupled with one another.

Each of the memory system 410 and the memory system 420 may be configured to perform authentication procedures associated with the device 405 and the device 415, respectively. For example, the memory system 410 may perform an authentication procedure to verify whether the device 405 is a trusted device (e.g., or whether code operating on the device 405 is trusted code), and the memory system 420 may perform an authentication procedure to verify whether the device 415 is a trusted device (e.g., or whether code operating on the device 415 is trusted code). For instance, each of the memory system 410 and the memory system 420 may receive respective first identification information (e.g., as described with reference to FIG. 3) from the device 405 and the device 415 and may compare the first identification to second identification information. Based on the comparison, the memory system 410 may determine that the device 405 is a trusted device and enable communications between the device 405 and a central processor of a vehicle in which the device 405 is incorporated. Alternatively, the memory system 410 may determine that the device 405 is an untrusted device and restrict communications between the device 405 and the central processor. Additionally or alternatively, the memory system 420 may determine whether the device 415 is a trusted device based on the comparison and accordingly enable or restrict communications between the device 415 and a central processor of a vehicle in which the device 415 is incorporated.

The memory system 410 and the memory system 420 may also support the authentication and verification of updates for the device 405 and the device 415, respectively, as described with reference to FIG. 3. For example, the memory system 410 may perform a second authentication procedure to verify whether an update for the device 405 is a trusted update and may enable or restrict downloading and installation of the update by the device 405 in accordance with the verification. Similarly, the memory system 420 may perform a second authentication procedure to verify whether an update for the device 415 is a trusted update and may enable or restrict downloading and installation of the update by the device 415 in accordance with the verification.

In some examples, the memory system 410 and the memory system 420 may be configured to periodically perform the authentication procedures associated with the device 405 and the device 415 (e.g., in accordance with a configured duration). In some examples, the memory system 410 and the memory system 420 may be configured to perform the authentication procedures associated with the device 405 and the device 415 in response to a triggering event. For example, the memory system 410 may perform an authentication procedure associated with the device 405 in response to a power-on procedure of a vehicle in which the device 405 is incorporated, a power-on procedure of a zonal computing system of the vehicle (e.g., of a central processor or a gateway processor of the zonal computing system), a power-on procedure of the device 405, or a combination thereof. The memory system 420 may perform an authentication procedure associated with the device 415 in response to a power-on procedure of a vehicle in which the device 415 is incorporated, a power-on procedure of a zonal computing system of the vehicle (e.g., of a central processor or a gateway processor of the zonal computing system), a power-on procedure of the device 415, or a combination thereof.

Figure 5:
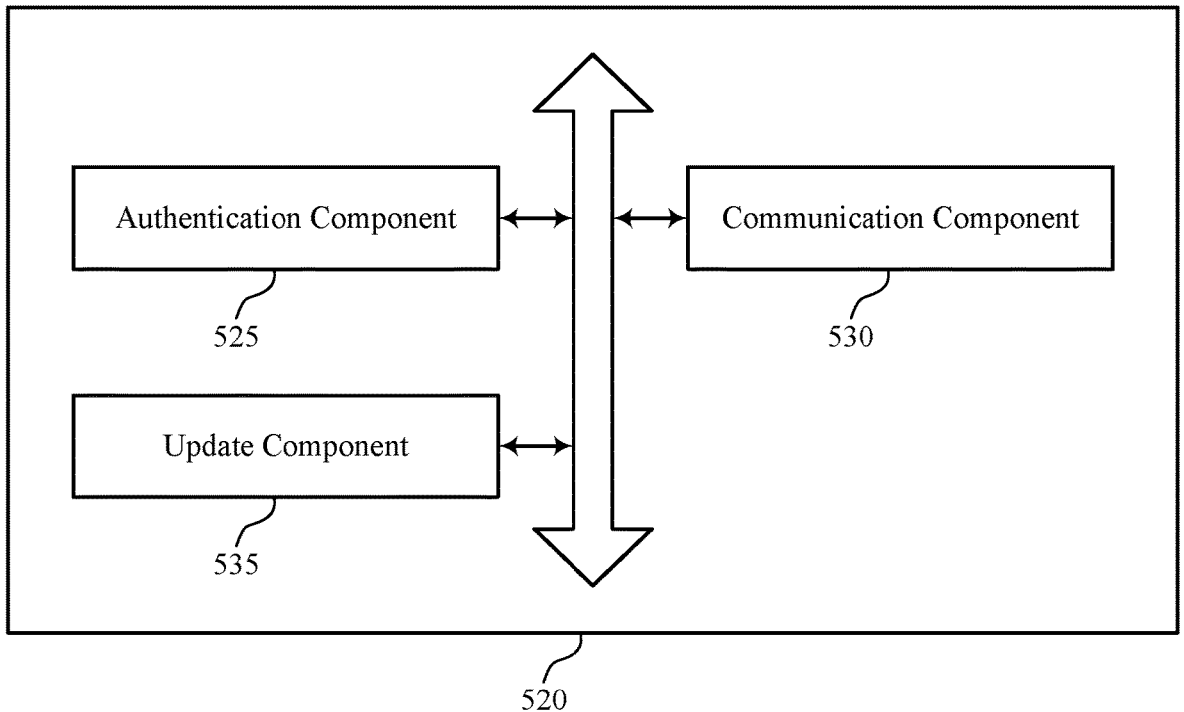
FIG. 5 shows a block diagram of a memory system that supports security configurations for zonal computing architecture in accordance with examples as disclosed herein.

FIG. 5 shows a block diagram 500 of a memory system 520 that supports security configurations for zonal computing architecture in accordance with examples as disclosed herein. The memory system 520 may be an example of aspects of a memory system as described with reference to FIGS. 1 through 4. The memory system 520, or various components thereof, may be an example of means for performing various aspects of security configurations for zonal computing architecture as described herein. For example, the memory system 520 may include an authentication component 525, a communication component 530, an update component 535, or any combination thereof. Each of these components may communicate, directly or indirectly, with one another (e.g., via one or more buses). The memory system 520 may be included in a zonal computing system in a vehicle as described herein.

The authentication component 525 may be configured as or otherwise support a means for performing an authentication procedure to verify whether a device configured to interact with the vehicle or an environment associated with the vehicle is a trusted device, where the device is coupled with a gateway processor of the zonal computing system that is associated with a zone associated with the zonal computing system. The communication component 530 may be configured as or otherwise support a means for enabling communications between the device and a central processor of the zonal computing system based at least in part on the authentication procedure, where the gateway processor routes the communications between the device and the central processor based at least in part on the enabling.

In some examples, to support performing the authentication procedure, the authentication component 525 may be configured as or otherwise support a means for receiving, from the device, first identification information. In some examples, to support performing the authentication procedure, the authentication component 525 may be configured as or otherwise support a means for comparing the first identification information to second identification information stored at the memory system to verify that the device is the trusted device, where the communications between the device and the central processor are enabled based at least in part on the comparison.

In some examples, the authentication component 525 may be configured as or otherwise support a means for performing a second authentication procedure to verify whether a second device for interacting with the vehicle or the environment associated with the vehicle is a second trusted device. In some examples, the communication component 530 may be configured as or otherwise support a means for restricting communications between the second device and the central processor based at least in part on the second authentication procedure indicating that the second device is untrusted.

In some examples, the authentication component 525 may be configured as or otherwise support a means for performing a second authentication procedure to verify whether an update associated with the device is a trusted update, the update including a software update for the device, a firmware update for the device, or both. In some examples, the update component 535 may be configured as or otherwise support a means for enabling the device to download and install the update based at least in part on the second authentication procedure.

In some examples, the authentication component 525 may be configured as or otherwise support a means for periodically performing the authentication procedure based at least in part on a triggering event, where the triggering event includes a first power-on procedure of the vehicle, a second power-on procedure of the zonal computing system, a third power-on procedure of the device, or a combination thereof.

In some examples, the device includes an actuator for controlling a subsystem of the vehicle or a sensor for measuring a physical property associated with the vehicle or the environment associated with the vehicle.

Figure 6:
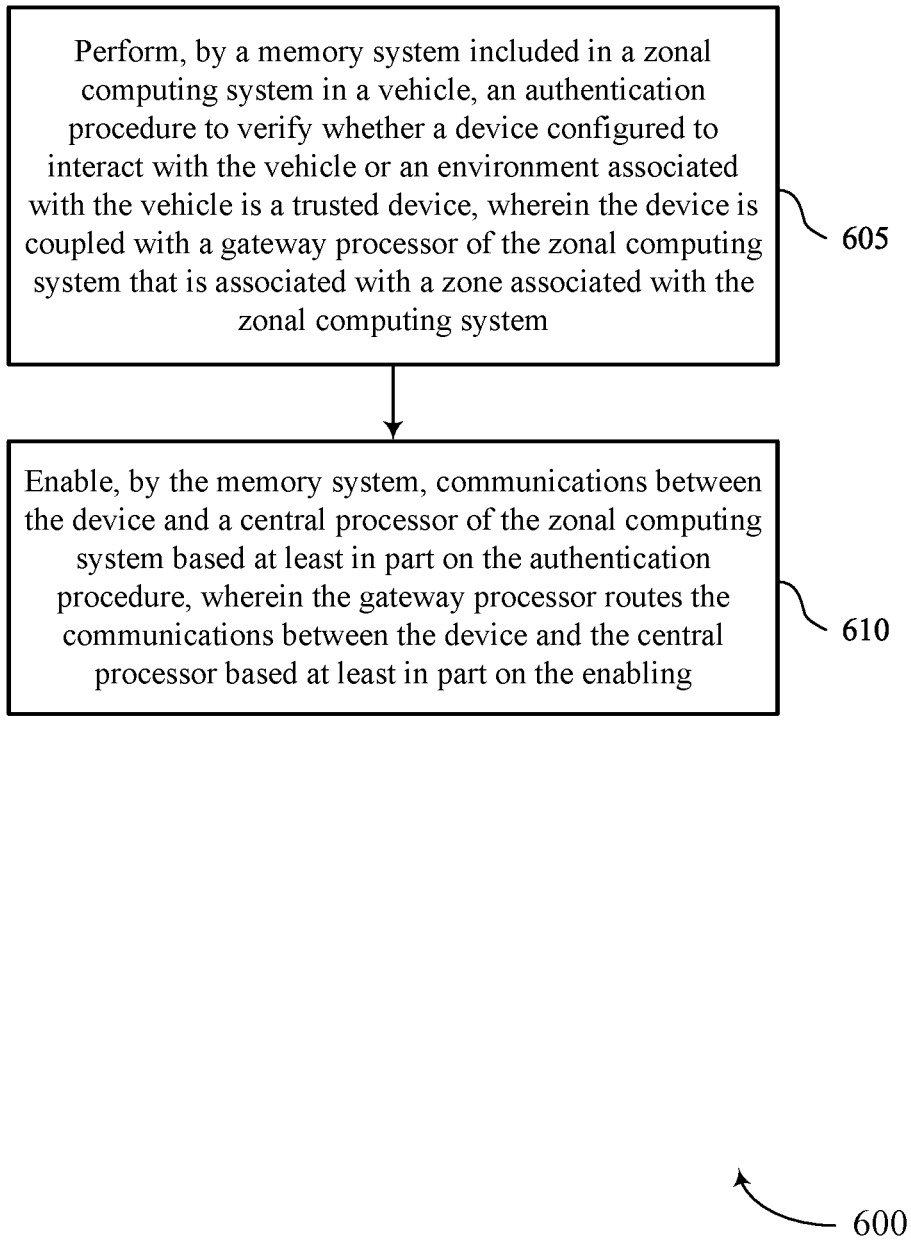
FIG. 6 shows a flowchart illustrating a method or methods that support security configurations for zonal computing architecture in accordance with examples as disclosed herein.

FIG. 6 shows a flowchart illustrating a method 600 that supports security configurations for zonal computing architecture in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware. The memory system may be included in a zonal computing system in a vehicle as described herein.

At 605, the method may include performing, an authentication procedure to verify whether a device configured to interact with the vehicle or an environment associated with the vehicle is a trusted device, where the device is coupled with a gateway processor of the zonal computing system that is associated with a zone associated with the zonal computing system. The operations of 605 may be performed in accordance with examples as disclosed herein. In some examples, aspects of the operations of 605 may be performed by an authentication component 525 as described with reference to FIG. 5.

At 610, the method may include enabling communications between the device and a central processor of the zonal computing system based at least in part on the authentication procedure, where the gateway processor routes the communications between the device and the central processor based at least in part on the enabling. The operations of 610 may be performed in accordance with examples as disclosed herein. In some examples, aspects of the operations of 610 may be performed by a communication component 530 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for performing, by a memory system included in a zonal computing system in a vehicle, an authentication procedure to verify whether a device configured to interact with the vehicle or an environment associated with the vehicle is a trusted device, where the device is coupled with a gateway processor of the zonal computing system that is associated with a zone associated with the zonal computing system and enabling, by the memory system, communications between the device and a central processor of the zonal computing system based at least in part on the authentication procedure, where the gateway processor routes the communications between the device and the central processor based at least in part on the enabling.

Aspect 2: The method, apparatus, or non-transitory computer-readable medium of aspect 1 where performing the authentication procedure includes operations, features, circuitry, logic, means, or instructions, or any combination thereof for receiving, from the device, first identification information and comparing the first identification information to second identification information stored at the memory system to verify that the device is the trusted device, where the communications between the device and the central processor are enabled based at least in part on the comparison.

Aspect 3: The method, apparatus, or non-transitory computer-readable medium of any of aspects 1 through 2, further including operations, features, circuitry, logic, means, or instructions, or any combination thereof for performing, by the memory system, a second authentication procedure to verify whether a second device for interacting with the vehicle or the environment associated with the vehicle is a second trusted device and restricting communications between the second device and the central processor based at least in part on the second authentication procedure indicating that the second device is untrusted.

Aspect 4: The method, apparatus, or non-transitory computer-readable medium of any of aspects 1 through 3, further including operations, features, circuitry, logic, means, or instructions, or any combination thereof for performing, by the memory system, a third authentication procedure to verify whether an update associated with the device is a trusted update, the update including a software update for the device, a firmware update for the device, or both and enabling, by the memory system, the device to download and install the update based at least in part on the third authentication procedure.

Aspect 5: The method, apparatus, or non-transitory computer-readable medium of any of aspects 1 through 4, further including operations, features, circuitry, logic, means, or instructions, or any combination thereof for periodically performing the authentication procedure based at least in part on a triggering event, where the triggering event includes a first power-on procedure of the vehicle, a second power-on procedure of the zonal computing system, a third power-on procedure of the device, or a combination thereof.

Aspect 6: The method, apparatus, or non-transitory computer-readable medium of any of aspects 1 through 5 where the device includes an actuator for controlling a subsystem of the vehicle or a sensor for measuring a physical property associated with the vehicle or the environment associated with the vehicle.

It should be noted that the methods described above describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 7: An apparatus, including: a zonal computing system in a vehicle, the zonal computing system including: a central processor configured to communicate with a remote server and a plurality of zones associated with the zonal computing system; a gateway processor coupled with the central processor and associated with a zone of the plurality of zones; a device configured to interact with the vehicle or an environment associated with the vehicle and coupled with the gateway processor, where the gateway processor is configured to route communications between the central processor and the device; and a memory system coupled with one or both of the central processor or the gateway processor and configured to perform an authentication procedure to verify whether the device is a trusted device and enable the communications between the central processor and the device based at least in part on the authentication procedure.

Aspect 8: The apparatus of aspect 7, where the memory system is configured to: receive, as part of the authentication procedure, first identification information from the device via the gateway processor, the central processor, or both; and compare, as part of the authentication procedure, the first identification information with second identification information stored at the memory system, where the verification of the device is based at least in part on the comparison.

Aspect 9: The apparatus of aspect 8, where the memory system is configured to: determine that the device is the trusted device based at least in part on the first identification information matching the second identification information; and enable the communications between the central processor and the device based least in part on determining that the device is the trusted device.

Aspect 10: The apparatus of aspect 8, where the memory system is configured to: determine that the device is an untrusted device based at least in part on the first identification information being different from the second identification information; and restrict the communications between the central processor and the device enables based at least in part on determining that the device is the untrusted device.

Aspect 11: The apparatus of any of aspects 7 through 9, where the memory system is configured to: perform a second authentication procedure to verify whether an update associated with the device is a trusted update, the update including a software update for the device, a firmware update for the device, or both; and enable the device to download and install the update based at least in part on the second authentication procedure.

Aspect 12: The apparatus of any of aspects 7 through 11, where the memory system is configured to periodically perform the authentication procedure based at least in part on a triggering event, where the triggering event includes a first power-on procedure of the vehicle, a second power-on procedure of the zonal computing system, a third power-on procedure of the device, or a combination thereof.

Aspect 13: The apparatus of any of aspects 7 through 12, where the device is configurable to couple with a second memory system, the second memory system configured to perform a third authentication procedure to verify whether the device is the trusted device and enable the communications between the central processor and the device based at least in part on the third authentication procedure.

Aspect 14: The apparatus of aspect 13, where the second memory system includes an interface that is configurable to couple with the device.

Aspect 15: The apparatus of any of aspects 7 through 14, where the gateway processor is configured to communicate with the central processor using a first communication protocol and communicate with the device using one or more different communication protocols, and the gateway processor is configured to translate information between the first communication protocol and the one or more different communication protocols.

Aspect 16: The apparatus of any of aspects 7 through 15, where: the zonal computing system includes a plurality of gateway processors associated with the zone, the plurality of gateway processors including the gateway processor, and the plurality of gateway processors are coupled with the central processor over a signal bus associated with the zone.

Aspect 17: The apparatus of any of aspects 7 through 16, where the device includes an actuator configured to control a subsystem of the vehicle.

Aspect 18: The apparatus of any of aspects 7 through 16, where the device includes a sensor configured to measure a physical property associated with the vehicle or the environment associated with the vehicle.

An apparatus is described. The following provides an overview of aspects of the apparatus as described herein:

Aspect 19: An apparatus, including: a device associated with a zone of a zonal computing system in a vehicle, where the device is configured to interact with the vehicle or an environment associated with the vehicle; and a memory system coupled with the device and configured to perform an authentication procedure to verify whether the device is a trusted device and enable communications between the device and a central processor of the zonal computing system based at least in part on the authentication procedure, where a gateway processor is configured to route the communications between the device and the central processor based at least in part on the authentication procedure, the gateway processor associated with the zone and coupled with the device and the central processor.

Aspect 20: The apparatus of aspect 19, where the memory system is configured to: receive, as part of the authentication procedure, first identification information from the device; and determine that the device is the trusted device based at least in part on a comparison between the first identification information and second identification information stored at the memory system, the comparison indicating a match between the first identification information and the second identification information.

Aspect 21: The apparatus of aspect 20, where the memory system is configured to: enable the communications between the device and the central processor based least in part on determining that the device is the trusted device.

Aspect 22: The apparatus of any of aspects 19 through 21, where the memory system is configured to: perform a second authentication procedure to verify whether an update associated with the device is a trusted update, the update including a software update for the device, a firmware update for the device, or both; and enable the device to download and install the update based at least in part on the second authentication procedure.

Aspect 23: The apparatus of any of aspects 19 through 22, where the memory system is configured to perform the authentication procedure periodically based at least in part on a triggering event, where the triggering event includes a first power-on procedure of the vehicle, a second power-on procedure of the zonal computing system, a third power-on procedure of the device, or a combination thereof.

Aspect 24: The apparatus of any of aspects 19 through 23, where the device includes an actuator configured to control a subsystem of the vehicle or a sensor configured to measure a physical property associated with the vehicle or the environment associated with the vehicle.

Aspect 25: The apparatus of any of aspects 19 through 24, where the memory system includes an interface that is configurable to couple with the device.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if" "when," "based on," or "based at least in part on" may be used interchangeably. In some examples, if the terms "if" "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and second condition or action may occur directly as a result of the previous condition or action occurring independent of whether other conditions or actions occur. In some examples, a first condition or action may be performed, and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a zonal computing system in a vehicle, the zonal computing system comprising:
a central processor configured to communicate with a remote server and a plurality of zones associated with the zonal computing system;
a gateway processor coupled with the central processor and associated with a zone of the plurality of zones;
a device configured to interact with the vehicle or an environment associated with the vehicle and coupled with the gateway processor, wherein the gateway processor is configured to route communications between the central processor and the device; and
a memory system coupled with one or both of the central processor or the gateway processor and configured to perform an authentication procedure to verify whether the device is a trusted device and enable the communications between the central processor and the device based at least in part on the authentication procedure, wherein the memory system is configured to perform the authentication procedure based at least in part on a triggering event comprising a first power-on procedure of the vehicle, a second power-on procedure of the zonal computing system, a third power-on procedure of the device, or a combination thereof.

2. The apparatus of claim 1, wherein the memory system is configured to:
receive, as part of the authentication procedure, first identification information from the device via the gateway processor, the central processor, or both; and
compare, as part of the authentication procedure, the first identification information with second identification information stored at the memory system, wherein the verification of the device is based at least in part on the comparison.

3. The apparatus of claim 2, wherein the memory system is configured to:
determine that the device is the trusted device based at least in part on the first identification information matching the second identification information; and
enable the communications between the central processor and the device based least in part on determining that the device is the trusted device.

4. The apparatus of claim 2, wherein the memory system is configured to:
determine that the device is an untrusted device based at least in part on the first identification information being different from the second identification information; and
restrict the communications between the central processor and the device based at least in part on determining that the device is the untrusted device.

5. The apparatus of claim 1, wherein the memory system is configured to:
perform a second authentication procedure to verify whether an update associated with the device is a trusted update, the update comprising a software update for the device, a firmware update for the device, or both; and
enable the device to download and install the update based at least in part on the second authentication procedure.

6. The apparatus of claim 1, wherein the memory system is configured to periodically perform the authentication procedure based at least in part on the triggering event.

7. The apparatus of claim 1, wherein the device is configurable to couple with a second memory system, the second memory system configured to perform a second authentication procedure to verify whether the device is the trusted device and enable the communications between the central processor and the device based at least in part on the second authentication procedure.

8. The apparatus of claim 7, wherein the second memory system comprises an interface that is configurable to couple with the device.

9. The apparatus of claim 1, wherein the gateway processor is configured to communicate with the central processor using a first communication protocol and communicate with the device using one or more different communication protocols, and the gateway processor is configured to translate information between the first communication protocol and the one or more different communication protocols.

10. The apparatus of claim 1, wherein:
the zonal computing system comprises a plurality of gateway processors associated with the zone, the plurality of gateway processors comprising the gateway processor, and
the plurality of gateway processors are coupled with the central processor over a signal bus associated with the zone.

11. The apparatus of claim 1, wherein the device comprises an actuator configured to control a subsystem of the vehicle.

12. The apparatus of claim 1, wherein the device comprises a sensor configured to measure a physical property associated with the vehicle or the environment associated with the vehicle.

13. An apparatus, comprising:
a device associated with a zone of a zonal computing system in a vehicle, wherein the device is configured to interact with the vehicle or an environment associated with the vehicle; and
a memory system coupled with the device and configured to perform an authentication procedure to verify whether the device is a trusted device and enable communications between the device and a central processor of the zonal computing system based at least in part on the authentication procedure, wherein the memory system is configured to perform the authentication procedure based at least in part on a triggering event comprising a first power-on procedure of the vehicle, a second power-on procedure of the zonal computing system, a third power-on procedure of the device, or a combination thereof, and
wherein a gateway processor is configured to route the communications between the device and the central processor based at least in part on the authentication procedure, the gateway processor associated with the zone and coupled with the device and the central processor.

14. The apparatus of claim 13, wherein the memory system is configured to:
receive, as part of the authentication procedure, first identification information from the device; and
determine that the device is the trusted device based at least in part on a comparison between the first identification information and second identification information stored at the memory system, the comparison indicating a match between the first identification information and the second identification information.

15. The apparatus of claim 14, wherein the memory system is configured to:
enable the communications between the device and the central processor based least in part on determining that the device is the trusted device.

16. The apparatus of claim 13, wherein the memory system is configured to:
perform a second authentication procedure to verify whether an update associated with the device is a trusted update, the update comprising a software update for the device, a firmware update for the device, or both; and
enable the device to download and install the update based at least in part on the second authentication procedure.

17. The apparatus of claim 13, wherein the memory system is configured to perform the authentication procedure periodically based at least in part on the triggering event.

18. The apparatus of claim 13, wherein the device comprises an actuator configured to control a subsystem of the vehicle or a sensor configured to measure a physical property associated with the vehicle or the environment associated with the vehicle.

19. The apparatus of claim 13, wherein the memory system comprises an interface that is configurable to couple with the device.

20. A method, comprising:
performing, by a memory system included in a zonal computing system in a vehicle, an authentication procedure to verify whether a device configured to interact with the vehicle or an environment associated with the vehicle is a trusted device, wherein the device is coupled with a gateway processor of the zonal computing system that is associated with a zone associated with the zonal computing system, and wherein the authentication procedure is performed based at least in part on a triggering event comprising a first power-on procedure of the vehicle, a second power-on procedure of the zonal computing system, a third power-on procedure of the device, or a combination thereof; and
enabling, by the memory system, communications between the device and a central processor of the zonal computing system based at least in part on the authentication procedure, wherein the gateway processor routes the communications between the device and the central processor based at least in part on the enabling.

21. The method of claim 20, wherein performing the authentication procedure comprises:
   receiving, from the device, first identification information; and
   comparing the first identification information to second identification information stored at the memory system to verify that the device is the trusted device, wherein the communications between the device and the central processor are enabled based at least in part on the comparison.

22. The method of claim 20, further comprising:
   performing, by the memory system, a second authentication procedure to verify whether a second device for interacting with the vehicle or the environment associated with the vehicle is a second trusted device; and
   restricting communications between the second device and the central processor based at least in part on the second authentication procedure indicating that the second device is untrusted.

23. The method of claim 20, further comprising:
   performing, by the memory system, a second authentication procedure to verify whether an update associated with the device is a trusted update, the update comprising a software update for the device, a firmware update for the device, or both; and
   enabling, by the memory system, the device to download and install the update based at least in part on the second authentication procedure.

24. The method of claim 20, further comprising:
   periodically performing the authentication procedure based at least in part on the triggering event.

25. The method of claim 20, wherein the device comprises an actuator for controlling a subsystem of the vehicle or a sensor for measuring a physical property associated with the vehicle or the environment associated with the vehicle.

* * * * *